United States Patent
Dong (10) Patent No.: US 12,401,470 B2
(45) Date of Patent: Aug. 26, 2025

(54) METHOD AND DEVICE FOR ALLOCATING COMMUNICATION RESOURCES, AND METHOD AND DEVICE FOR TRANSMITTING DATA

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 385 days.

(21) Appl. No.: 17/620,070

(22) PCT Filed: Jun. 19, 2019

(86) PCT No.: PCT/CN2019/091946
§ 371 (c)(1),
(2) Date: Dec. 16, 2021

(87) PCT Pub. No.: WO2020/252704
PCT Pub. Date: Dec. 24, 2020

(65) Prior Publication Data
US 2022/0368482 A1    Nov. 17, 2022

(51) Int. Cl.
*H04L 5/00* (2006.01)
*H04W 16/02* (2009.01)
*H04W 72/0453* (2023.01)

(52) U.S. Cl.
CPC .......... *H04L 5/0046* (2013.01); *H04L 5/0048* (2013.01); *H04W 16/02* (2013.01); *H04W 72/0453* (2013.01)

(58) Field of Classification Search
CPC ... H04L 5/0046; H04L 5/0048; H04L 5/0005; H04L 5/0044; H04L 5/0094;
(Continued)

(56) References Cited

U.S. PATENT DOCUMENTS 9,894,653 B2    2/2018    Huang et al.
2016/0081090 A1    3/2016    Jung et al.
(Continued)

FOREIGN PATENT DOCUMENTS

CN    105228252 A    1/2016
CN    106576364 A    4/2017
(Continued)

OTHER PUBLICATIONS

Korean Patent Application No. 10-2022-7000649, Office Action dated Nov. 20, 2023, 5 pages.
(Continued)

*Primary Examiner* — Yu-Wen Chang
(74) *Attorney, Agent, or Firm* — Cozen O'Connor (57) ABSTRACT

A method for allocating communication resources, for an access point (AP) in a communications network includes trigger frame including a plurality of frequency band information bits and communication resource information corresponding to each of a plurality of frequency bands identified by the plurality of frequency band information bits. The trigger frame is generated, in which the plurality of frequency bands identified by the plurality of frequency band information bits and the communication resource information corresponding to each of the plurality of frequency bands are configured to transmit uplink data for at least one station (STA). The trigger frame is transmitted to the at least one STA.

16 Claims, 6 Drawing Sheets

(58) Field of Classification Search
CPC . H04W 16/02; H04W 72/0453; H04W 84/12; H04W 88/08; H04W 74/006; H04W 74/00; H04W 88/02

See application file for complete search history.

(56) References Cited

U.S. PATENT DOCUMENTS

| | | | | |
|---|---|---|---|---|
| 2016/0165589 | A1* | 6/2016 | Chu | H04W 4/06 |
| | | | | 370/329 |
| 2016/0302185 | A1* | 10/2016 | Sun | H04L 5/0007 |
| 2017/0026151 | A1* | 1/2017 | Adachi | H04W 72/0453 |
| 2017/0195991 | A1* | 7/2017 | Ahn | H04W 72/52 |
| 2017/0208625 | A1 | 7/2017 | Choi et al. | |
| 2018/0198496 | A1 | 7/2018 | Seok | |
| 2018/0302858 | A1 | 10/2018 | Son et al. | |
| 2019/0124556 | A1* | 4/2019 | Verma | H04L 5/0064 |
| 2019/0141706 | A1 | 5/2019 | Gupta et al. | |
| 2021/0176643 | A1* | 6/2021 | Jang | H04W 16/10 |
| 2021/0250133 | A1* | 8/2021 | Chun | H04L 1/00 |
| 2021/0258806 | A1* | 8/2021 | Stacey | H04W 48/12 |
| 2022/0015141 | A1* | 1/2022 | Huang | H04W 72/0453 |
| 2022/0217797 | A1* | 7/2022 | Kim | H04W 76/15 |
| 2024/0306134 | A1* | 9/2024 | Hu | H04L 5/0094 |

FOREIGN PATENT DOCUMENTS

| | | |
|---|---|---|
| CN | 107113830 A | 8/2017 |
| CN | 107431584 A | 12/2017 |
| CN | 108702375 A | 10/2018 |
| JP | 2019500801 A | 1/2019 |
| KR | 20160030842 A | 3/2016 |
| KR | 20180088470 A | 8/2018 |

OTHER PUBLICATIONS

Korean Patent Application No. 10-2022-7000649, English translation of Office Action dated Nov. 20, 2023, 5 pages.
Park, M. et al. "Beyond 802.11ax—Throughput Enhancement Utilizing Multi-bands across 2.4/5/6 GHz Bands" doc.: IEEE 802.11-18/857r0, May 2018, 9 pages.
European Patent Application No. 19933860.9, Search and Opinion dated Dec. 13, 2022, 13 pages.
PCT/CN2019/091946 International Search Report dated Mar. 20, 2020, 2 pages.
Russian Patent Application No. 2022100263, Office Action dated Sep. 8, 2022, 11 pages.
Russian Patent Application No. 2022100263, English translation of Office Action dated Sep. 8, 2022, 9 pages.
Japanese Patent Application No. 2021-575049, Office Action dated Nov. 8, 2022, 4 pages.
Japanese Patent Application No. 2021-575049, English translation of Office Action dated Nov. 8, 2022, 4 pages.
Cariou, L., Intel "CR for 6GHz" IEEE 802.11-18/0397r2, Mar. 2018, 7 pages.
Streeter, A., Sirius XM Radio, Inc. "In-Vehicle Wireless Interference" IEEE 802.19-16/0106r0, Jul. 2016, 10 pages.
Chen, X. et al., Intel "Discussions on the PHY features for EHT" IEEE 802.11-18/1461r1, Sep. 2018, 22 pages.
Indian Patent Application No. 202247002386, Office Action dated Sep. 23, 2024, 3 pages.
Chinese Patent Application No. 201980001109.8, First Office Action dated Sep. 15, 2022, 6 pages.
Chinese Patent Application No. 201980001109.8, English translation of First Office Action dated Sep. 15, 2022, 10 pages.
Chinese Patent Application No. 201980001109.8, Second Office Action dated May 31, 2023, 8 pages.
Chinese Patent Application No. 201980001109.8, English translation of Second Office Action dated May 31, 2023, 14 pages.

* cited by examiner

METHOD AND DEVICE FOR ALLOCATING COMMUNICATION RESOURCES, AND METHOD AND DEVICE FOR TRANSMITTING DATA

CROSS-REFERENCE TO RELATED APPLICATION

This application is a national phase of International Application No. PCT/CN2019/091946, filed on Jun. 19, 2019, the content of which is hereby incorporated by reference in its entirety.

TECHNICAL FIELD

This disclosure relates to the field of communication technologies, and more particularly, to a method and an apparatus for allocating communication resources, a method and an apparatus for transmitting data, a trigger frame, an access point (AP), a station (STA) and a computer-readable storage medium.

BACKGROUND

The Institute of Electrical and Electronics Engineers (IEEE) 802.11 established a study group (SG) in May 2018, to research the next generation mainstream wireless fidelity (Wi-Fi) technology, as the rapid development of wireless communication technologies progressed. The researched content includes transmission at 320 MHz bandwidth, aggregation and coordination of multiple frequency bands and the like. The proposed goal of the study group is to improve the speed and throughput of the existing 802.11ax by at least four times. The scenarios are video transmission, augmented reality (AR), virtual reality (VR) and the like.

The aggregation of multiple frequency bands means that a device transmits data in multiple frequency bands simultaneously, for example, in 2.4 GHz, 5.8 GHz and 6-7.125 GHz simultaneously. The advantages are that the throughput of the entire system can be improved and the success rate of transmitting and receiving data may also be improved.

In the previous generation Wi-Fi standard IEEE802.11ax, in order to improve the effective utilization rate of spectrums, an orthogonal frequency division multiple access (OFDMA) modulation mode was adopted. A resource allocation message (trigger) frame may be configured to allocate communication resources for multiple stations (STAs) at a certain bandwidth, that is, in a single frequency band, so that multiple STAs can simultaneously perform uplink communication with an access point (AP). In the next generation Wi-Fi technology, i.e., IEEE802.11be, in order to be compatible with IEEE802.11ax, OFDMA modulation mode will continue to be used. However, in the IEEE802.11be, devices will be able to communicate simultaneously in multiple frequency bands. Therefore, multiple STAs must be able to communicate simultaneously with an AP in multiple frequency bands.

SUMMARY

According to a first aspect, embodiments of the disclosure provide a method for allocating communication resources, for an AP. The method includes the following.

A trigger frame including a plurality of frequency band information bits and communication resource information corresponding to each of a plurality of frequency bands identified by the plurality of frequency band information bits, is generated, in which the plurality of frequency bands identified by the plurality of frequency band information bits and the communication resource information corresponding to each of the plurality of frequency bands are configured to transmit uplink data for at least one STA.

The trigger frame is transmitted to the at least one STA.

According to a second aspect, embodiments of the disclosure provide a method for transmitting data, for a STA. The method includes the following.

A trigger frame from an AP is received, in which the trigger frame includes a plurality of frequency band information bits and communication resource information corresponding to each of a plurality of frequency bands identified by the plurality of frequency band information bits.

For a current STA, the plurality of frequency bands identified by the plurality of frequency band information bits and a communication resource corresponding to each of the plurality of frequency bands, are obtained from the trigger frame.

Data are transmitted to the AP by using the corresponding communication resource in each of the plurality of frequency bands.

According to a third aspect, embodiments of the disclosure provide an AP.

The AP includes: a processor.

The AP further includes: a memory for storing processor executable instructions.

The processor is configured to perform as follows.

A trigger frame including a plurality of frequency band information bits and communication resource information corresponding to each of a plurality of frequency bands identified by the plurality of frequency band information bits, is generated, in which the plurality of frequency bands identified by the plurality of frequency band information bits and the communication resource information corresponding to each of the plurality of frequency bands are configured to transmit uplink data for at least one STA.

The trigger frame is transmitted to the at least one STA.

According to a fourth aspect, embodiments of the disclosure provide a STA.

The STA includes: a processor.

The STA further includes: a memory for storing processor executable instructions.

The processor is configured to perform as follows.

A trigger frame from an AP is received, in which the trigger frame includes a plurality of frequency band information bits and communication resource information corresponding to each of a plurality of frequency bands identified by the plurality of frequency band information bits.

For a current STA, the plurality of frequency bands identified by the plurality of frequency band information bits and a communication resource corresponding to each of the plurality of frequency bands, are obtained from the trigger frame.

Data are transmitted to the AP by using the corresponding communication resource in each of the plurality of frequency bands.

According to a fifth aspect, embodiments of the disclosure provide a computer-readable storage medium having computer instructions stored thereon. When the instructions are executed by a processor, the actions of the above method for allocating communication resources are implemented.

According to a sixth aspect, embodiments of the disclosure provide a computer-readable storage medium having computer instructions stored thereon. When the instructions are executed by a processor, the actions of the above method for transmitting data are implemented.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodi

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
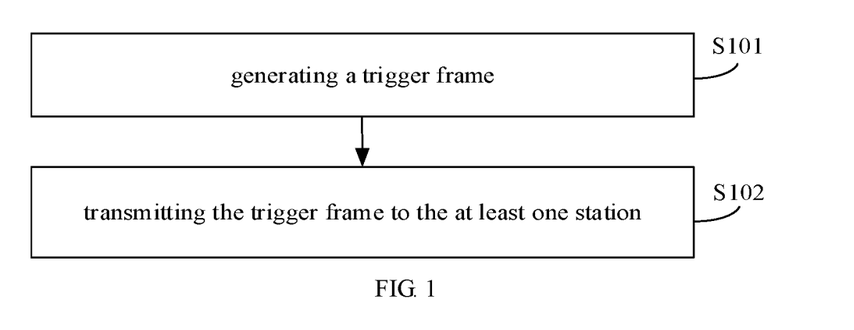
- FIG. 1 is a flowchart of a method for allocating communication resources according to an exemplary embodiment of the disclosure.

FIG. 1 is a flowchart of a method for allocating communication resources according to an exemplary embodiment of the disclosure. The embodiments may be described from the AP side. As illustrated in FIG. 1, the method for allocating communication resources includes the following.

In S101, a trigger frame including a plurality of frequency band information bits and communication resource information corresponding to each of a plurality of frequency bands identified by the plurality of frequency band information bits is generated, in which the plurality of frequency bands identified by the plurality of frequency band information bits and the communication resource information corresponding to each of the plurality of frequency bands are configured to transmit uplink data for at least one STA.

In some embodiments, the AP can allocate communication resources in the plurality of frequency bands to the at least one STA. Since the plurality of frequency bands have different channel characteristics, the trigger frame including the plurality of frequency band information bits is generated. The plurality of frequency band information bits are configured to identify the plurality of frequency bands.

In some embodiments, when each of the plurality of frequency band information bits is a first value, it indicates that the frequency band identified by the corresponding frequency band information bit is 2.4 GHz. When each of the plurality of frequency band information bits is a second value, it indicates that the frequency band identified by the corresponding frequency band information bit is 5.8 GHz. When each of the plurality of frequency band information bits is a third value, it indicates that the frequency band identified by the corresponding frequency band information bit is 6-7.125 GHz. When each of the plurality of frequency band information bits is a fourth value, it indicates that the frequency band identified by the corresponding frequency band information bit is 45 GHz. When each of the plurality of frequency band information bits is a fifth value, it indicates that the frequency band identified by the corresponding frequency band information bit is 60 GHz.

In some embodiments, the trigger frame includes a plurality of common information (info) fields and at least one user information field. A number of the plurality of common information fields is the same as a number of the plurality of frequency bands. Each of the plurality of common information fields is corresponding to each of the at least one user information field respectively. The trigger frame combines at least one information bit of each of the plurality of common information fields and/or at least one information bit of each of the at least one user information field as one of the plurality of frequency band information bits. Each of the plurality of frequency band information bits is configured to identify a frequency band of a STA corresponding to each of the at least one user information field. For example, the plurality of frequency bands may be identified by the trigger frame of the frame structure in Table 1a. As shown in Table 1a, the trigger frame may include a plurality of common information fields and at least one user information field, in which the number of common information fields is the same as the number of the plurality of frequency bands and each of the plurality of common information fields corresponds to each of the at least one user information field. For example, the trigger frame may include 3 common information fields and 2 user information fields. In Table 1a, the number of common information fields is 3 and the number of user information fields is 6. It should be noted that the positions in the common information fields and the user information fields in Table 1a may change. For example, each common information field may correspond to 2 user information fields, as shown in Table 1b.

As shown in Table 2, the common information field includes a reserved bit. As shown in Table 3, the user information field includes a reserved bit and a trigger dependent user info and the trigger dependent user info is a variable and is 1 bit. The trigger frame may use the reserved bit in each common information field and the reserved bit and variable in each user information field as the frequency band information bits to identify the frequency band. For example, when the two reserved bits and the variable are 000, the frequency band 2.4 GHz can be identified. When the two reserved bits and the variable are 001, the frequency band 5 GHz can be identified. When the two reserved bits and the variable are 010, the frequency band 6-7.125 GHz can be identified. When the two reserved bits and the variable are 011, the frequency band 45 GHz can be identified. When the two reserved bits and the variable are 100, the frequency band 60 GHz can be identified. When the trigger frame includes 3 common information fields and two STAs, it is assumed that the three common information fields are common information field 1 to common information field 3 and the two STAs are STA1 and STA2. STA1 corresponds to user information field 1 and STA2 corresponds to user information field 2. The reserved bit in common information field 1 and the reserved bit and variable in user information field 1 can be used as the frequency band information bit to identify a frequency band of STA1. The reserved bit in common information field 2 and the reserved bit and variable in user information field 1 can be used as the frequency band information bit to identify another frequency band of STA1. The reserved bit in common information field 3 and the reserved bit and variable in user information field 1 can be used as the frequency band information bit to identify still another frequency band of STA1. Similarly, the reserved bit in common information field 1 and the reserved bit and variable in the user information field 2 can be used as the frequency band information bit to identify a frequency band of STA2. The reserved bit in common information field 2 and the reserved bit and variable in user information field 2 can be used as the frequency band information bit to identify another frequency band of STA2. The reserved bit in common information field 3 and the reserved bit and variable in user information field 2 can be used as the frequency band information bit to identify still another frequency band of STA2. In the embodiments, each of the plurality of frequency bands corresponds to a communication resource. In detail, the number of common information fields in Table 1a is related to the number of actual operating frequency bands. For example, the actual operating frequency bands are 2.4 GHz and 6-7.125 GHz. Then, the number of common information fields is 2. The number of user information fields is related to the number of STAs that simultaneously transmit uplink data frames in each of the plurality of frequency bands. For example, under 2.4 GHz, there will be 3 STAs that are simultaneously transmitting uplink data frames and the number of user information fields is 3. The common information field corresponds to the user information field. The number of user information fields corresponding to each common information field can be the same or different. The communication resources may be allocated to the RU in Table 3.

TABLE 1a schematic diagram 1 of frame structure of a trigger frame

| Frame control | Duration | RA | TA | Common info | ... | Common info | User info | ... | User info |
|---|---|---|---|---|---|---|---|---|---|

TABLE 1b schematic diagram 2 of frame structure of the trigger frame

| Frame control | Duration | RA | TA | Common info | User info | User info | Common info | User info | User info |
|---|---|---|---|---|---|---|---|---|---|

TABLE 2 schematic diagram 1 of structure of a common information field

| reserved | Trigger dependent common info |
|---|---|

TABLE 3 schematic diagram of structure of a user information field

| AID12 | RU allocation | ... | reserved | trigger dependent user info |
|---|---|---|---|---|

Optionally, the trigger frame may also include an uplink (UL) bandwidth (BW) information bit. Different bandwidth values are identified when the UL BW information bit take different values. For example, when the UL BW information bit is a first value, it indicates that the UL BW identified by the UL BW information bit is 20 MHz. When the UL BW information bit is a second value, it indicates that the UL BW identified by the UL BW information bit is 40 MHz. When the UL BW information bit is a third value, it indicates that the UL BW identified by the UL BW information bit is 80 MHz. When the UL BW information bit is a fourth value, it indicates that the UL BW identified by the UL BW information bit is 160 MHz. When the UL BW information bit is a fifth value, it indicates that the UL BW identified by the UL BW information bit is 320 MHz.

Optionally, the UL BWs can be the same or inconsistent in different frequency bands. In addition, the UL data communication resources are allocated for the same STA in different frequency bands, which can also be limited to that the UL data communication resources are allocated for the same STA in one frequency band. The UL data communication resources can be all communication resource units (RUs) of the entire UL BW or part of the consecutive communication RUs on the UL BW, for example, a total of 242-tone RU can be transmitted on 20 MHz UL BW, which can be divided into two 106-tone RUs and these two 106-tone RUs are allocated for two STAs. In order to identify the UL communication RUs for allocating to a specific STA, association identifiers (AIDs) are used as identifiers. AID is the unique identifier assigned by the AP to the STA in a basic service set (BSS) during the association process. Furthermore, the AP allocates an AID for a certain STA in a plurality of frequency bands or allocates one associated identifier for the STA in each of the plurality of frequency bands, for example, allocates AID A under 2.4 GHz, 5.8 GHz and 6-7.125 GHz, or allocates AIDs B, C and D under these three frequency bands respectively. The length of the AID is 16 bits.

For example, as shown in Table 4, the common information field includes UL BW, where UL BW is two bits. As shown in Table 2, the common information field also includes trigger dependent common info. The trigger dependent common info is a variable and is 1 bit. In the embodiments, the UL BW and the variable in the common information field can be used as the UL BW information bit. For example, when the UL BW and the variable are 000, the UL BW is identified as 20 MHz. When the UL BW and the variable are 001, the UL BW is identified as 40 MHz. When the UL BW and the variable are 010, the UL BW is identified as 80 MHz. When the UL BW and the variable are 011, the UL BW is identified as 160 MHz. When the UL BW and the variable are 100, the UL BW is identified as 320 MHz.

TABLE 4 schematic diagram 2 of structure of common information field

| trigger type | ... | UL BW |
| --- | --- | --- |

The communication resources are related to the UL BW identified by the UL BW information bit. For example, if the base station allocates the communication resources to two STAs under 2.4 GHZ 20 MHZ UL BW, the communication resources allocated for the first STA are subcarriers 0 to 12 and the communication resources allocated for the second STA are subcarrier 13 to subcarrier 25. If the base station allocates the communication resources for the two STAs under the 2.4 GHZ 40 MHZ UL BW, the communication resources allocated for the first STA are subcarriers 0 to 25 and the communication resources allocated for the second STA are subcarriers 26 to 51.

It should be noted that Table 1a to Table 4 are only representative schematic diagrams of the frame structure of the trigger frame and the frame structure used in practical applications may be different from the foregoing structure.

In S102, the trigger frame is transmitted to the at least one STA.

After generating the trigger frame, the AP may transmit the trigger frame to the at least one STA, so that each STA can obtain the plurality of frequency bands allocated by the AP and a communication resource corresponding to each of the plurality of frequency bands based on the received trigger frame and the corresponding communication resource is used to transmit data to the AP in each of the plurality of frequency bands.

In the above embodiments, the trigger frame including the plurality of frequency band information bits and the communication resource information corresponding to each of the plurality of frequency bands identified by the plurality of frequency band information bits is generated and the trigger frame is transmitted to the at least one STA, so that the at least one STA can simultaneously transmit data with the AP in the plurality of frequency bands, thereby improving the network throughput.

Figure 2:
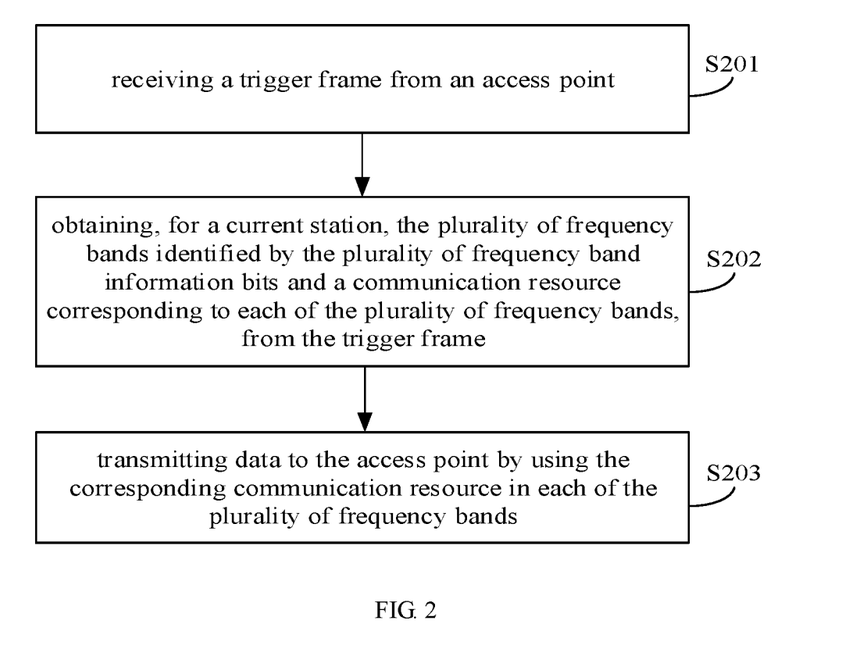
FIG. 2 is a flowchart of a method for transmitting data according to an exemplary embodiment of the disclosure.

FIG. 2 is a flowchart of a method for transmitting data according to an exemplary embodiment of the disclosure. The embodiments may be described from the STA side. As illustrated in FIG. 2, the method for transmitting data includes the following.

In S201, a trigger frame is received from an AP, in which the trigger frame includes a plurality of frequency band information bits and communication resource information corresponding to each of a plurality of frequency bands identified by the plurality of frequency band information bits.

Optionally, before performing S201, the method may further include: transmitting a data transmission request to the AP, and generating and transmitting the trigger frame by the AP after receiving the data transmission request.

In S202, for a current STA, the plurality of frequency bands identified by the plurality of frequency band information bits and a communication resource corresponding to each of the plurality of frequency bands, are obtained from the trigger frame.

In the embodiments, the STA may agree with the AP on the analyzing mode of the trigger frame or may receive the analyzing mode of the trigger frame from the AP and obtain the plurality of frequency bands identified by the plurality of frequency band information bits and the communication resource corresponding to each of the plurality of frequency bands from the trigger frame according to the analyzing mode.

In the embodiments, the plurality of frequency bands and the UL BW corresponding to each of the plurality of frequency bands can be obtained from the trigger frame and a communication resource corresponding to each of the plurality of frequency bands can be obtained according to the UL BW corresponding to each of the plurality of frequency bands.

The number of common information fields is the same as the number of the plurality of frequency bands and each common information field corresponds to at least one user information field of the same number of the at least one STA. Therefore, the plurality of frequency bands allocated to the current STA and the communication resource corresponding to each of the plurality of frequency bands can be obtained according to each common information field and the user information field corresponding to the current STA. For example, the plurality of frequency bands allocated to the current STA can be obtained according to the reserved bit in each common information field and the reserved bit and variable in the user information field corresponding to the current STA.

Assuming that the AP allocates three frequency bands to the STA, the current STA can obtain the first frequency band allocated by the AP for the current STA according to the reserved bit in the first common information field and the reserved bit and variable in the user information field corresponding to the current STA. Moreover, the current STA obtains the UL BW corresponding to the first frequency band from the user information field and obtains the communication resource corresponding to the first frequency band according to the UL BW corresponding to the first frequency band. Similarly, the second frequency band allocated by the AP for the current STA is obtained according to the reserved bit in the second common information field and the reserved bit and variable in the user information field corresponding to the current STA, the UL BW corresponding to the second frequency band is obtained from the user information field and the communication resource corresponding to the second frequency band is obtained according to the UL BW corresponding to the second frequency band. The third frequency band allocated by the AP for the current STA is obtained according to the reserved bit in the third common information field and the reserved bit and variable in the user information field corresponding to the current STA, the UL BW corresponding to the third frequency band is obtained from the user information field and the communication resource corresponding to the third frequency band is obtained according to the UL BW corresponding to the third frequency band.

In S203, data are transmitted to the AP by using the corresponding communication resource in each of the plurality of frequency bands.

In the embodiments, after obtaining the plurality of frequency bands identified by the plurality of frequency band information bits and the communication resource information corresponding to each of the plurality of frequency bands, allocated to the current STA, from the trigger frame, the communication resource corresponding to each of the plurality of frequency bands is used to transmit the data to the AP in each of the plurality of frequency bands.

In the embodiments, by receiving the trigger frame from the AP and obtaining the plurality of frequency bands identified by the plurality of frequency band information bits and the communication resource information corresponding to each of the plurality of frequency bands, allocated to the current STA, from the trigger frame, the communication resource corresponding to each of the plurality of frequency bands is used to transmit data to the AP in each of the plurality of frequency bands, so that data can be transmitted to the AP in the plurality of frequency bands simultaneously, which improves the network throughput.

Figure 3:
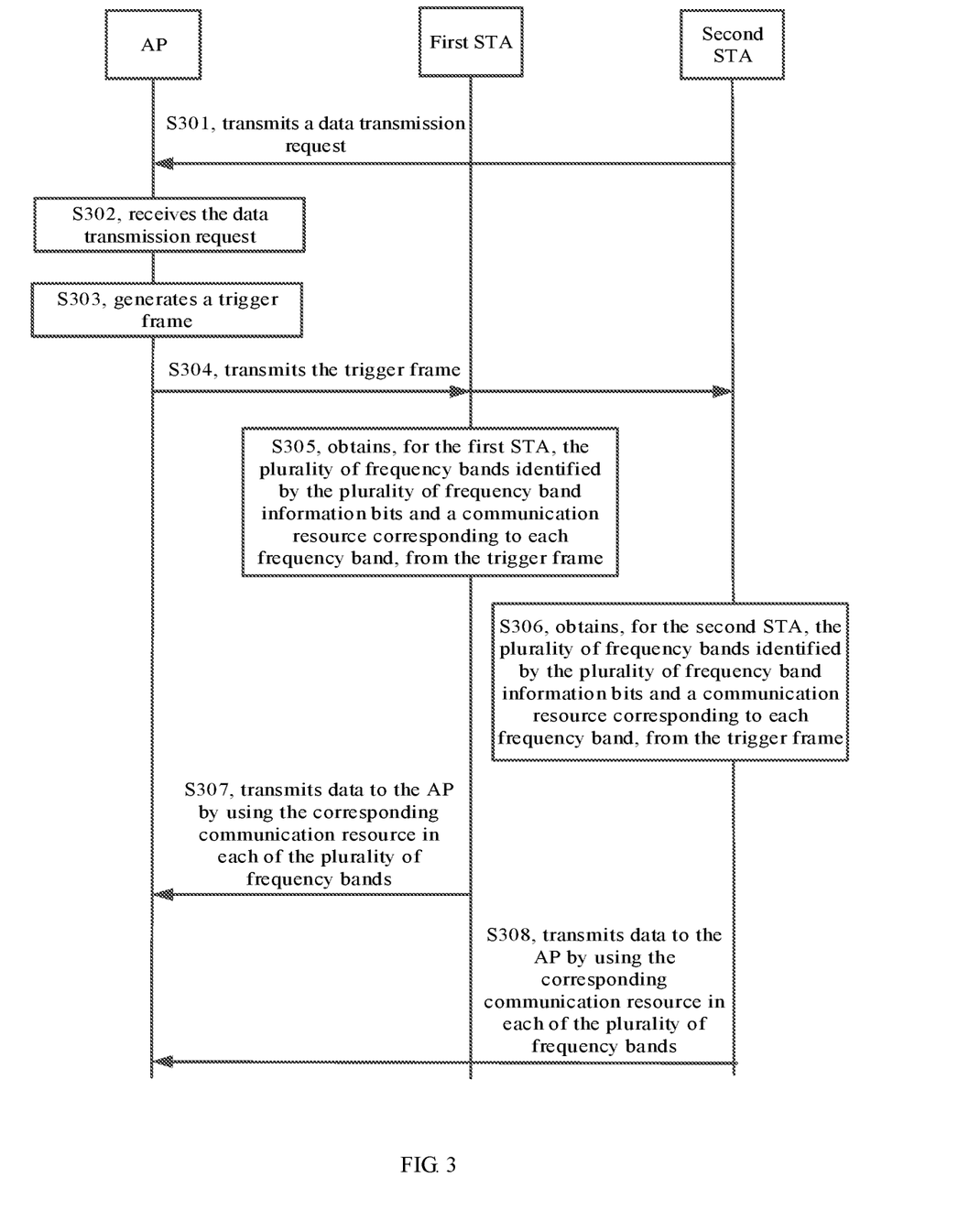
FIG. 3 is a signaling flowchart of a method for transmitting data according to an exemplary embodiment of the disclosure.

FIG. 3 is a signaling flowchart of a method for transmitting data according to an exemplary embodiment of the disclosure. The embodiments may be described from the perspective of interaction among the AP, the first STA and the second STA. As illustrated in FIG. 3, the method for transmitting data includes the following.

In S301, the first STA and the second STA transmit a data transmission request to the AP.

In S302, the AP receives the data transmission request from the first STA and the second STA.

In S303, the AP generates a trigger frame including a plurality of frequency band information bits and communication resource information corresponding to each of a plurality of frequency bands identified by the plurality of frequency band information bits, in which the plurality of frequency bands identified by the plurality of frequency band information bits and the communication resource information corresponding to each of the plurality of frequency bands are configured to transmit uplink data for the first STA and the second STA.

In S304, the AP transmits the trigger frame to the first STA and the second STA.

In S305, the first STA receives the trigger frame from the AP and obtains the plurality of frequency bands identified by the plurality of frequency band information bits and a communication resource corresponding to each of the plurality of frequency bands, allocated to the first STA, from the trigger frame.

In S306, the second STA receives the trigger frame from the AP and obtains the plurality of frequency bands identified by the plurality of frequency band information bits and a communication resource corresponding to each of the plurality of frequency bands, allocated to the second STA, from the trigger frame.

In S307, the first STA uses the corresponding communication resources to transmit data to the AP in each of the plurality of the frequency bands.

In S308, the second STA uses the corresponding communication resources to transmit data to the AP in each of the plurality of the frequency bands.

In the above embodiments, the AP interacts with the first STA and the second STA, so that the first STA and the second STA can simultaneously transmit data to the AP in the plurality of frequency bands, which improves the network throughput.

Figure 4:
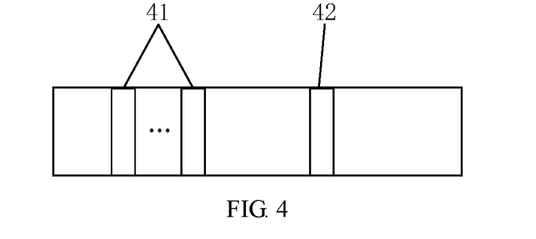
FIG. 4 is a schematic diagram of a trigger frame according to an exemplary embodiment of the disclosure.

FIG. 4 is a schematic diagram of a trigger frame according to an exemplary embodiment of the disclosure. As illustrated in FIG. 4, the trigger frame includes a plurality of frequency band information bits 41 and communication resource information corresponding to each of the plurality of frequency bands identified by the plurality of frequency band information bits 41, in which the plurality of frequency bands identified by the plurality of the frequency band information bits 41 and the communication resource information corresponding to each of the plurality of the frequency bands are configured to transmit UL data to at least one STA.

In the embodiments, the trigger frame may include a plurality of common information fields and at least one user information field. The number of common information fields is the same as the number of the plurality of frequency bands. Each of the plurality of common information fields corresponds to each of the at least one user information field. The trigger frame regards at least one information bit in each of the plurality of common information fields and/or at least one information bit in each of the at least one user information field as the frequency band information bit. Each frequency band information bit is configured to identify the frequency band of the STA corresponding to each of at least one user information field. Optionally, as illustrated in FIG. 4, the trigger frame may further include an UL BW information bit 42 and the communication resource information is related to the UL BW identified by the UL BW information bit 42.

The AP and at least one STA may communicate through the trigger frame of the structure in FIG. 4 and the implementation process may refer to FIG. 1, FIG. 2 or FIG. 3, which will not be repeated herein.

Figure 5:
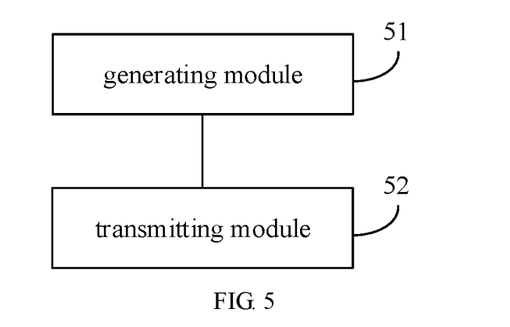
FIG. 5 is a block diagram of an apparatus for allocating communication resources according to an exemplary embodiment.

FIG. 5 is a block diagram of an apparatus for allocating communication resources according to an exemplary embodiment. The apparatus may be located in the AP. As illustrated in FIG. 5, the apparatus for allocating communication resources includes: a generating module 51 and a transmitting module 52.

The generating module 51 is configured to generate a trigger frame including a plurality of frequency band information bits and communication resource information corresponding to each of a plurality of frequency bands identified by the plurality of frequency band information bits, in which the plurality of frequency bands identified by the plurality of frequency band information bits and the communication resource information corresponding to each of the plurality of frequency bands are configured to transmit UL data for at least one STA.

In some embodiments, the AP can allocate communication resources in the plurality of frequency bands to the at least one STA. Since the plurality of frequency bands have different channel characteristics, the trigger frame including the plurality of frequency band information bits is generated. The plurality of frequency band information bits are configured to identify the plurality of frequency bands.

In some embodiments, when each of the plurality of frequency band information bits is a first value, it indicates that the frequency band identified by the corresponding frequency band information bit is 2.4 GHz. When each of the plurality of frequency band information bits is a second value, it indicates that the frequency band identified by the corresponding frequency band information bit is 5.8 GHz. When each of the plurality of frequency band information bits is a third value, it indicates that the frequency band identified by the corresponding frequency band information bit is 6-7.125 GHz. When each of the plurality of frequency band information bits is a fourth value, it indicates that the frequency band identified by the corresponding frequency band information bit is 45 GHz. When each of the plurality of frequency band information bits is a fifth value, it indicates that the frequency band identified by the corresponding frequency band information bit is 60 GHz.

In some embodiments, the trigger frame includes a plurality of common information fields and at least one user information field. A number of the plurality of common information fields is the same as a number of the plurality of frequency bands. Each of the plurality of common information fields is corresponding to each of the at least one user information field respectively. The trigger frame combines at least one information bit of each of the plurality of common information fields and/or at least one information bit of each of the at least one user information field as one of the plurality of frequency band information bits. Each of the plurality of frequency band information bits is configured to identify a frequency band of a STA corresponding to each of the at least one user information field.

For example, the plurality of frequency bands may be identified by the trigger frame of the frame structure in Table 1a. As shown in Table 1a, the trigger frame may include a plurality of common information fields and at least one user information field, in which the number of common information fields is the same as the number of the plurality of frequency bands and each of the plurality of common information fields corresponds to each of the at least one user information field. For example, the trigger frame may include 3 common information fields and 2 user information fields. In Table 1a, the number of common information fields is 3 and the number of user information fields is 6. It should be noted that the positions in the common information fields and the user information fields in Table 1a may change. For example, each common information field may correspond to 2 user information fields, as shown in Table 1b.

As shown in Table 2, the common information field includes a reserved bit. As shown in Table 3, the user information field includes a reserved bit and a trigger dependent user info and the trigger dependent user info is a variable and is 1 bit. The trigger frame may use the reserved bit in each common information field and the reserved bit and variable in each user information field as the frequency band information bits to identify the frequency band. For example, when the two reserved bits and the variable are 000, the frequency band 2.4 GHz can be identified. When the two reserved bits and the variable are 001, the frequency band 5 GHz can be identified. When the two reserved bits and the variable are 010, the frequency band 6-7.125 GHz can be identified. When the two reserved bits and the variable are 011, the frequency band 45 GHz can be identified. When the two reserved bits and the variable are 100, the frequency band 60 GHz can be identified. When the trigger frame includes 3 common information fields and two STAs, it is assumed that the three common information fields are common information field 1 to common information field 3 and the two STAs are STA1 and STA2. STA1 corresponds to user information field 1 and STA2 corresponds to user information field 2. The reserved bit in common information field 1 and the reserved bit and variable in user information field 1 can be used as the frequency band information bit to identify a frequency band of STA1. The reserved bit in common information field 2 and the reserved bit and variable in user information field 1 can be used as the frequency band information bit to identify another frequency band of STA1. The reserved bit in common information field 3 and the reserved bit and variable in user information field 1 can be used as the frequency band information bit to identify still another frequency band of STA1. Similarly, the reserved bit in common information field 1 and the reserved bit and variable in the user information field 2 can be used as the frequency band information bit to identify a frequency band of STA2. The reserved bit in common information field 2 and the reserved bit and variable in user information field 2 can be used as the frequency band information bit to identify another frequency band of STA2. The reserved bit in common information field 3 and the reserved bit and variable in user information field 2 can be used as the frequency band information bit to identify still another frequency band of STA2.

In the embodiments, each of the plurality of frequency bands corresponds to a communication resource. In detail, the number of common information fields in Table 1a is related to the number of actual operating frequency bands. For example, the actual operating frequency bands are 2.4 GHz and 6-7.125 GHz. Then, the number of common information fields is 2. The number of user information fields is related to the number of STAs that simultaneously transmit uplink data frames in each of the plurality of frequency bands. For example, under 2.4 GHz, there will be 3 STAs that are simultaneously transmitting uplink data frames and the number of user information fields is 3. The common information field corresponds to the user information field. The number of user information fields corresponding to each common information field can be the same or different. The communication resources may be allocated to the RU in Table 3.

Optionally, the trigger frame may also include an UL BW information bit. When the UL BW information bit is a first value, it indicates that the UL BW identified by the UL BW information bit is 20 MHz. When the UL BW information bit is a second value, it indicates that the UL BW identified by the UL BW information bit is 40 MHz. When the UL BW information bit is a third value, it indicates that the UL BW identified by the UL BW information bit is 80 MHz. When the UL BW information bit is a fourth value, it indicates that the UL BW identified by the UL BW information bit is 160 MHz. When the UL BW information bit is a fifth value, it indicates that the UL BW identified by the UL BW information bit is 320 MHz.

Optionally, the UL BWs can be the same or inconsistent in different frequency bands. In addition, the UL data communication resources are allocated for the same STA in different frequency bands, which can also be limited to that the UL data communication resources are allocated for the same STA in one frequency band. The UL data communication resources can be all communication resource units (RUs) of the entire UL BW or part of the consecutive communication RUs on the UL BW, for example, a total of 242-tone RU can be transmitted on 20 MHz UL BW, which can be divided into two 106-tone RUs and these two 106-tone RUs are allocated for two STAs. In order to identify the UL communication RUs for allocating to a specific STA, association identifiers (AIDs) are used as identifiers. AID is the unique identifier assigned by the AP to the STA in a basic service set (BSS) during the association process. Furthermore, the AP allocates an AID for a certain STA in a plurality of frequency bands or allocates one associated identifier for the STA in each of the plurality of frequency bands, for example, allocates AID A under 2.4 GHz, 5.8 GHz and 6-7.125 GHz, or allocates AIDs B, C and D under these three frequency bands respectively. The length of the AID is 16 bits.

For example, as shown in Table 4, the common information field includes UL BW, where UL BW is two bits. As shown in Table 2, the common information field also includes trigger dependent common info. The trigger dependent common info is a variable and is 1 bit. In the embodiments, the UL BW and the variable in the common information field can be used as the UL BW information bit. For example, when the UL BW and the variable are 000, the UL BW is identified as 20 MHz. When the UL BW and the variable are 001, the UL BW is identified as 40 MHz. When the UL BW and the variable are 010, the UL BW is identified as 80 MHz. When the UL BW and the variable are 011, the UL BW is identified as 160 MHz. When the UL BW and the variable are 100, the UL BW is identified as 320 MHz.

The communication resources are related to the UL BW identified by the UL BW information bit. For example, if the base station allocates the communication resources to two STAs under 2.4 GHZ 20 MHZ UL BW, the communication resources allocated for the first STA are subcarriers 0 to 12 and the communication resources allocated for the second STA are subcarrier 13 to subcarrier 25. If the base station allocates the communication resources for the two STAs under the 2.4 GHZ 40 MHZ UL BW, the communication resources allocated for the first STA are subcarriers 0 to 25 and the communication resources allocated for the second STA are subcarriers 26 to 51.

It should be noted that Table 1a to Table 4 are only schematic diagrams of the frame structure of the trigger frame and the frame structure used in practical applications may be different from the foregoing structure.

The transmitting module 52 is configured to transmit the trigger frame to the at least one STA.

After generating the trigger frame, the AP may transmit the trigger frame to the at least one STA, so that each STA can obtain the plurality of frequency bands allocated by the AP and a communication resource corresponding to each of the plurality of frequency bands based on the received trigger frame and the corresponding communication resource is used to transmit data to the AP in each of the plurality of frequency bands.

In the above embodiments, the trigger frame including the plurality of frequency band information bits and the communication resource information corresponding to each of the plurality of frequency bands identified by the plurality of frequency band information bits is generated and the trigger frame is transmitted to the at least one STA, so that the at least one STA can simultaneously transmit data with the AP in the plurality of frequency bands, thereby improving the network throughput.

Figure 6:
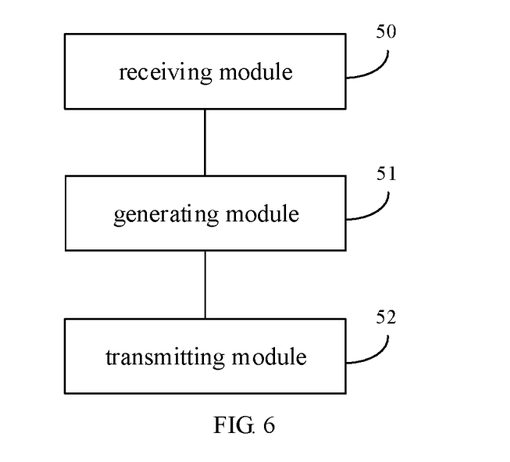
FIG. 6 is a block diagram of an apparatus for allocating communication resources according to an exemplary embodiment.

FIG. 6 is a block diagram of an apparatus for allocating communication resources according to an exemplary embodiment. As illustrated in FIG. 6, based on the embodiments illustrated in FIG. 5, the apparatus may further include: a receiving module 50.

The receiving module 50 is configured to receive a data transmission request from each STA before the generating module 51 generates the trigger frame.

In the above embodiments, the trigger frame is generated based on the received data transmission request from each STA, so as to trigger generation of the trigger frame based on the data transmission request, thereby providing conditions for subsequent data transmission by the plurality of frequency bands.

Figure 7:
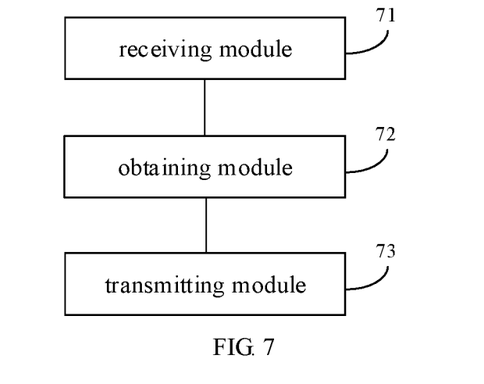
FIG. 7 is a block diagram of an apparatus for transmitting data according to an exemplary embodiment.

FIG. 7 is a block diagram of an apparatus for transmitting data according to an exemplary embodiment. The apparatus may be located in a STA. As illustrated in FIG. 7, the apparatus for transmitting data includes: a receiving module 71, an obtaining module 72 and a transmitting module 73.

The receiving module 71 is configured to receive a trigger frame from an AP, in which the trigger frame includes a plurality of frequency band information bits and communication resource information corresponding to each of a plurality of frequency bands identified by the plurality of frequency band information bits.

The obtaining module 72 is configured to obtain, for a current station, the plurality of frequency bands identified by the plurality of frequency band information bits and a communication resource corresponding to each of the plurality of frequency bands, from the trigger frame received by the receiving module.

In the embodiments, the STA may agree with the AP on the analyzing mode of the trigger frame or may receive the analyzing mode of the trigger frame from the AP and obtain the plurality of frequency bands identified by the plurality of frequency band information bits and the communication resource corresponding to each of the plurality of frequency bands from the trigger frame according to the analyzing mode.

In the embodiments, the plurality of frequency bands and the UL BW corresponding to each of the plurality of frequency bands can be obtained from the trigger frame and a communication resource corresponding to each of the plurality of frequency bands can be obtained according to the UL BW corresponding to each of the plurality of frequency bands.

The number of common information fields is the same as the number of the plurality of frequency bands and each common information field corresponds to at least one user information field of the same number of the at least one STA. Therefore, the plurality of frequency bands allocated to the current STA and the communication resource corresponding to each of the plurality of frequency bands can be obtained according to each common information field and the user information field corresponding to the current STA. For example, the plurality of frequency bands allocated to the current STA can be obtained according to the reserved bit in each common information field and the reserved bit and variable in the user information field corresponding to the current STA.

Assuming that the AP allocates three frequency bands to the STA, the current STA can obtain the first frequency band allocated by the AP for the current STA according to the reserved bit in the first common information field and the reserved bit and variable in the user information field corresponding to the current STA. Moreover, the current STA obtains the UL BW corresponding to the first frequency band from the user information field and obtains the communication resource corresponding to the first frequency band according to the UL BW corresponding to the first frequency band. Similarly, the second frequency band allocated by the AP for the current STA is obtained according to the reserved bit in the second common information field and the reserved bit and variable in the user information field corresponding to the current STA, the UL BW corresponding to the second frequency band is obtained from the user information field and the communication resource corresponding to the second frequency band is obtained according to the UL BW corresponding to the second frequency band. The third frequency band allocated by the AP for the current STA is obtained according to the reserved bit in the third common information field and the reserved bit and variable in the user information field corresponding to the current STA, the UL BW corresponding to the third frequency band is obtained from the user information field and the communication resource corresponding to the third frequency band is obtained according to the UL BW corresponding to the third frequency band.

The transmitting module 73 is configured to transmit data to the AP by corresponding using the communication resource in each of the plurality of frequency bands.

In the embodiments, after obtaining the plurality of frequency bands identified by the plurality of frequency band information bits and the communication resource information corresponding to each of the plurality of frequency bands, allocated to the current STA, from the trigger frame, the communication resource corresponding to each of the plurality of frequency bands is used to transmit the data to the AP in each of the plurality of frequency bands.

In the embodiments, by receiving the trigger frame from the AP and obtaining the plurality of frequency bands identified by the plurality of frequency band information bits and the communication resource information corresponding to each of the plurality of frequency bands, allocated to the current STA, from the trigger frame, the communication resource corresponding to each of the plurality of frequency bands is used to transmit data to the AP in each of the plurality of frequency bands, so that data can be transmitted to the AP in the plurality of frequency bands simultaneously, which improves the network throughput.

Figure 8:
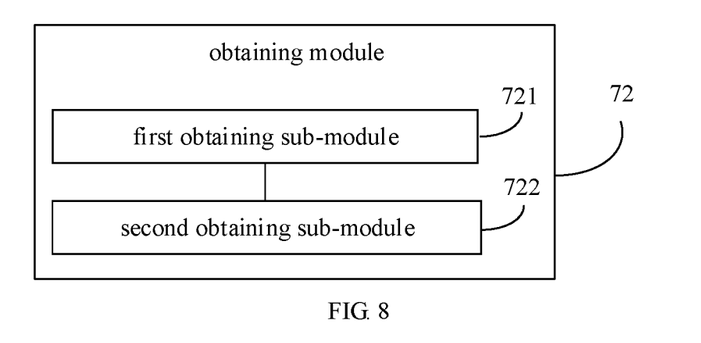
FIG. 8 is a block diagram of another apparatus for transmitting data according to an exemplary embodiment.

FIG. 8 is a block diagram of another apparatus for transmitting data according to an exemplary embodiment. As illustrated in FIG. 8, based on the embodiments illustrated in FIG. 7, the obtaining module 72 may include: a first obtaining sub-module 721 and a second obtaining sub-module 722.

The first obtaining sub-module 721 is configured to obtain the plurality of frequency bands and an uplink bandwidth corresponding to each of the plurality of frequency bands, from the trigger frame.

The second obtaining sub-module 722 is configured to obtain the communication resource corresponding to each of the plurality of frequency bands based on the uplink bandwidth corresponding to each of the plurality of frequency bands and obtained by the first obtaining sub-module.

In the above embodiments, the plurality of frequency bands and the UL BW corresponding to each of the plurality of frequency bands are obtained from the trigger frame, and the communication resource corresponding to each of the plurality of frequency bands is obtained based on the UL BW corresponding to each of the plurality of frequency bands and obtained by the first obtaining sub-module, such that the implementation manner is simple.

Figure 9:
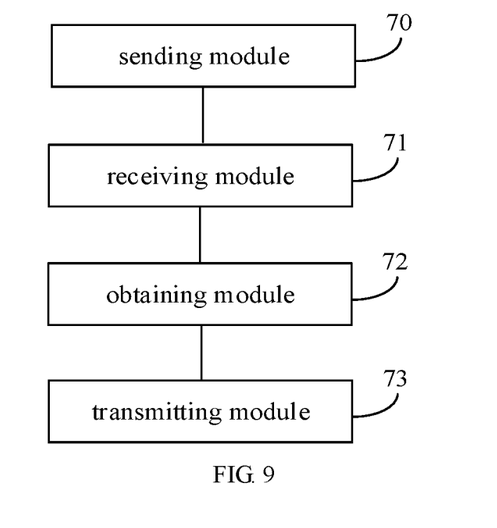
FIG. 9 is a block diagram of another apparatus for transmitting data according to an exemplary embodiment.

FIG. 9 is a block diagram of another apparatus for transmitting data according to an exemplary embodiment. As illustrated in FIG. 9, based on the above embodiments illustrated in FIG. 7, the apparatus may further include: a sending module 70.

The sending module 70 is configured to transmit a data transmission request to the AP before the receiving module 71 receives the trigger frame from the access point.

In the above embodiments, the data transmission request is transmitted to the AP to request the AP to allocate communication resources for data transmission.

Figure 10:
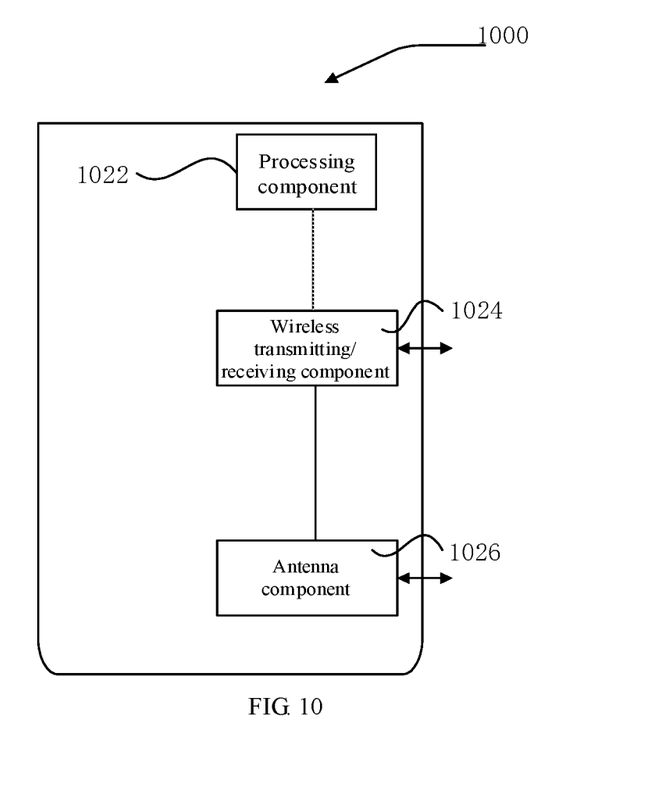
FIG. 10 is a block diagram of a device for allocating communication resources according to an exemplary embodiment.

FIG. 10 is a block diagram of a device for allocating communication resources according to an exemplary embodiment. The device 1000 may be provided as an AP. As illustrated in FIG. 10, the device 1000 includes a processing component 1022, a wireless transmitting/receiving component 1024, an antenna component 1026, and a signal processing part specific to a wireless interface. The processing component 1022 may further include one or more processors.

One of the processors in the processing component 1022 is configured to perform as follows.

A trigger frame including a plurality of frequency band information bits and communication resource information corresponding to each of a plurality of frequency bands identified by the plurality of frequency band information bits, is generated, in which the plurality of frequency bands identified by the plurality of frequency band information bits and the communication resource information corresponding to each of the plurality of frequency bands are configured to transmit uplink data for at least one STA.

The trigger frame is transmitted to the at least one STA.

In some embodiments, there is also provided a non-transitory computer-readable storage medium including instructions, in which the instructions can be executed by the processing component 1022 of the device 1000 to complete the method for allocating communication resources described above. For example, the non-transitory computer-readable storage medium may be a read only memory (ROM), a random access memory (RAM), a CD-ROM, a magnetic tape, a floppy disk, or an optical data storage device.

Figure 11:
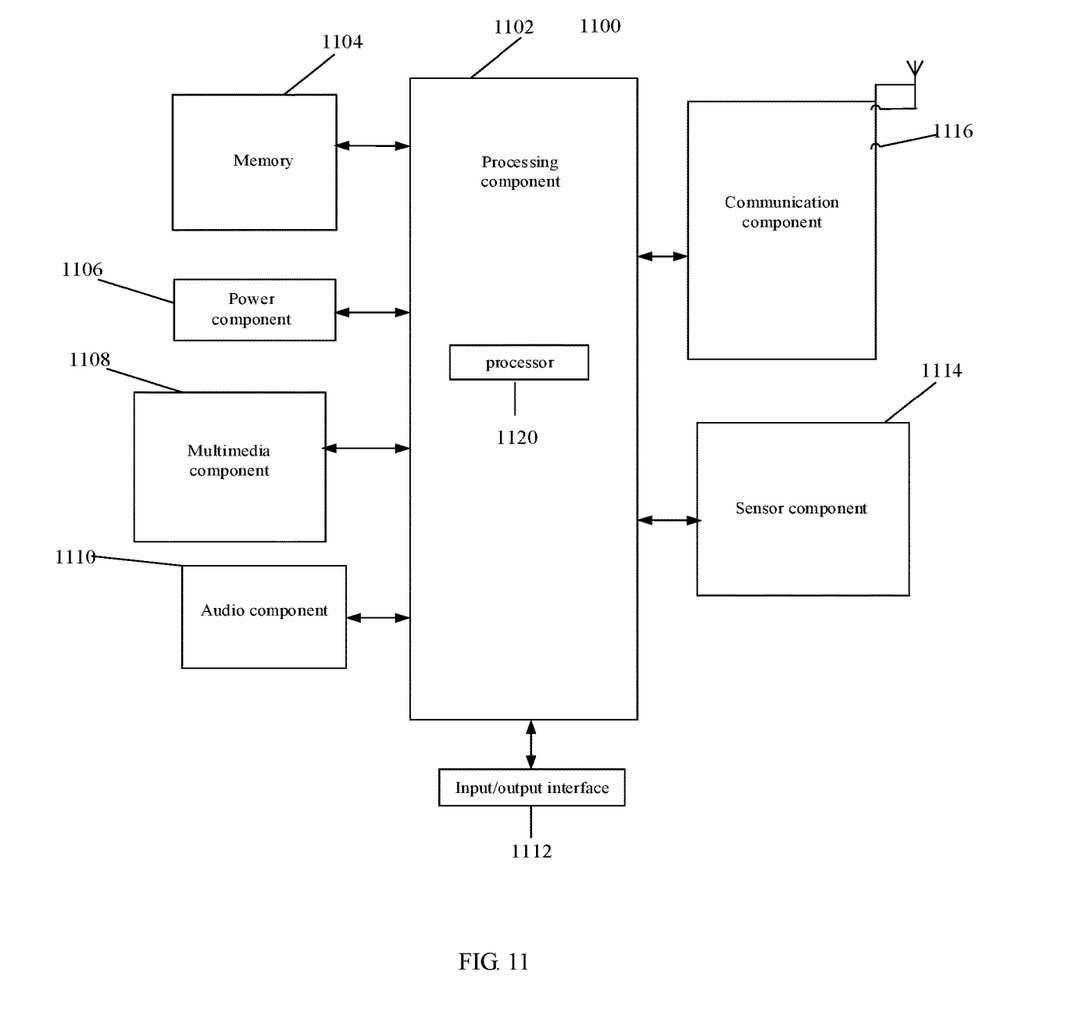
FIG. 11 is a block diagram of a device for transmitting data according to an exemplary embodiment.

FIG. 11 is a block diagram of another device 1100 for transmitting data according to an exemplary embodiment. The device 1100 may be a mobile phone, a computer, a digital broadcasting terminal, a message transceiver device, a game console, a tablet device, a medical device, a fitness device, and a personal digital assistant.

As illustrated in FIG. 11, the device 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 generally controls overall operations of the device 1100, such as the operations associated with display, telephone calls, data communications, camera operations, and recording operations. The processing component 1102 may include one or more processors 1120 to execute instructions to perform all or part of the actions in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The processor 1120 in the processing component 1102 is configured to perform as follows.

A trigger frame from an AP is received, in which the trigger frame includes a plurality of frequency band information bits and communication resource information corresponding to each of a plurality of frequency bands identified by the plurality of frequency band information bits.

For a current STA, the plurality of frequency bands identified by the plurality of frequency band information bits and a communication resource corresponding to each of the plurality of frequency bands, are obtained from the trigger frame.

Data are transmitted to the AP by using the corresponding communication resource in each of the plurality of frequency bands.

The memory 1104 is configured to store various types of data to support the operation of the device 1100. Examples of such data include instructions for any applications or methods operated on the device 1100, contact data, phonebook data, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the device 1100. The power component 1106 may include a power management system, one or more power sources, and any other components associated with the generation, management, and distribution of power in the device 1100.

The multimedia component 1108 includes a screen providing an output interface between the device 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1108 includes a front-facing camera and/or a rear-facing camera. When the device 1100 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 1110 is configured to output and/or input audio signals. For example, the audio component 1110 includes a microphone (MIC) configured to receive an external audio signal when the device 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 includes one or more sensors to provide status assessments of various aspects of the device 1100. For instance, the sensor component 1114 may detect an open/closed status of the device 1100, relative positioning of components, e.g., the display and the keypad, of the device 1100, a change in position of the device 1100 or a component of the device 1100, a presence or absence of user contact with the device 1100, an orientation or an acceleration/deceleration of the device 1100, and a change in temperature of the device 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wirelessly, between the device 1100 and other devices. The device 1100 can access a wireless network based on a communication standard, such as Wi-Fi, 2G or 3G or a combination thereof. In an exemplary embodiment, the communication component 1116 receives a broadcast signal or broadcast associated information from an external broadcast management system via a broadcast channel. In an exemplary embodiment, the communication component 1116 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the device 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In exemplary embodiments, there is also provided a non-transitory computer-readable storage medium including instructions, such as included in the memory 1104, executable by the processor 1120 in the device 1100, for performing the above methods. For example, the non-transitory computer-readable storage medium may be a ROM, a RAM, a CD-ROM, a magnetic tape, a floppy disc, an optical data storage device, and the like.

The apparatus or device embodiments basically correspond to the method embodiments and relevant parts refer to the part of the description of the method embodiments. The apparatus or device embodiments described above are merely illustrative, where the units described as separate components may or may not be physically separated and the components displayed as units may or may not be physical units, that is, the units may be located in one place or distributed to a plurality of network units. Some or all of the modules can be selected according to actual needs, so that those of ordinary skill in the art can understand and implement the objectives of the solution of the embodiments, without inventive works.

The technical solutions of the embodiments of the disclosure may include the following beneficial effects.

The AP generates the trigger frame including the plurality of frequency band information bits and the communication resource information corresponding to each of the plurality of frequency bands identified by the plurality of frequency band information bits and transmits the trigger frame to the at least one STA, such that the at least one STA can simultaneously transmit data with the AP in the plurality of frequency bands, thereby improving the network throughput.

The STA receives the trigger frame from the AP, obtains the plurality of frequency bands identified by the plurality of frequency band information bits and the communication resource information corresponding to each of the plurality of frequency bands, allocated to the current STA, from the trigger frame and uses the corresponding communication resource to transmit data to the AP in each of the plurality of frequency bands, such that data can be transmitted with the AP in the plurality of frequency bands simultaneously and the network throughput is improved.

It should be noted that in the disclosure, relational terms such as first and second are only used to distinguish one entity or operation from another entity or operation, and do not necessarily require or imply any such actual relationship or order between these entities or operations. The terms "include", "comprise", or any other variants thereof are intended to cover non-exclusive inclusion, so that a process, method, article or device that includes a series of elements includes not only those elements, but also other elements that are not explicitly listed, or also include elements inherent to such process, method, article or device. Without more restrictions, the element defined by the sentence "comprising a . . . " does not exclude the existence of other identical elements in the process, method, article or device that includes the element.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for allocating communication resources, for an access point, comprising:
   generating a trigger frame comprising a plurality of frequency band information bits and communication resource information corresponding to each of a plurality of frequency bands identified by the plurality of frequency band information bits, wherein the plurality of frequency bands identified by the plurality of frequency band information bits and the communication resource information corresponding to each of the plurality of frequency bands are configured to simultaneously transmit uplink data for one station, wherein the trigger frame further comprises an uplink bandwidth information bit and the communication resource information is related to an uplink bandwidth identified by the uplink bandwidth information bit; and
   transmitting the trigger frame to the one station.

2. The method as claimed in claim 1, wherein
   when each of the plurality of frequency band information bits is a first value, it indicates a frequency band identified by a corresponding frequency band information bit is 2.4 GHZ;
   when each of the plurality of frequency band information bits is a second value, it indicates that the frequency band identified by the corresponding frequency band information bit is 5.8 GHz; and
   when each of the plurality of frequency band information bits is a third value, it indicates that the frequency band identified by the corresponding frequency band information bit is 6-7.125 GHz.

3. The method as claimed in claim 1, wherein
   when the uplink bandwidth information bit is a first value, it indicates that the uplink bandwidth identified by the uplink bandwidth information bit is 20 MHz;
   when the uplink bandwidth information bit is a second value, it indicates that the uplink bandwidth identified by the uplink bandwidth information bit is 40 MHz;
   when the uplink bandwidth information bit is a third value, it indicates that the uplink bandwidth identified by the uplink bandwidth information bit is 80 MHz;
   when the uplink bandwidth information bit is a fourth value, it indicates that the uplink bandwidth identified by the uplink bandwidth information bit is 160 MHz; and
   when the uplink bandwidth information bit is a fifth value, it indicates that the uplink bandwidth identified by the uplink bandwidth information bit is 320 MHz.

4. The method as claimed in claim 1, further comprising:
   receiving a data transmission request from the one station before generating the trigger frame.

5. The method as claimed in claim 1, wherein the trigger frame comprises a plurality of common information fields and at least one user information field; a number of the plurality of common information fields is the same as a number of the plurality of frequency bands; each of the plurality of common information fields is corresponding to each of the at least one user information field respectively; the trigger frame combines at least one information bit of each of the plurality of common information fields and/or at least one information bit of each of the at least one user information field as one of the plurality of frequency band information bits;
   and each of the plurality of frequency band information bits is configured to identify a frequency band of a station corresponding to each of the at least one user information field.

6. A non-transitory computer-readable storage medium having computer instructions stored thereon, wherein when the instructions are executed by a processor, the method for allocating communication resources according to claim 1 is performed.

7. A method for transmitting data, for a station, comprising:
   receiving a trigger frame from an access point (AP), wherein the trigger frame comprises a plurality of frequency band information bits and communication resource information corresponding to each of a plurality of frequency bands identified by the plurality of frequency band information bits, wherein, the plurality of frequency bands identified by the plurality of frequency band information bits and the communication resource information corresponding to each of the plurality of frequency bands are configured to simultaneously transmit uplink data for one station, the trigger frame further comprises an uplink bandwidth information bit and the communication resource information is related to an uplink bandwidth identified by the uplink bandwidth information bit;
   obtaining, for a current station, the plurality of frequency bands identified by the plurality of frequency band information bits and a communication resource corresponding to each of the plurality of frequency bands, from the trigger frame; and
   transmitting data to the access point by using the corresponding communication resource in each of the plurality of frequency bands.

8. The method as claimed in claim 7, wherein obtaining, for the current station, the plurality of frequency bands identified by the plurality of frequency band information bits and the communication resource corresponding to each of the plurality of frequency bands, from the trigger frame, comprises:
obtaining the plurality of frequency bands and an uplink bandwidth corresponding to each of the plurality of frequency bands, from the trigger frame; and
obtaining the communication resource corresponding to each of the plurality of frequency bands based on the uplink bandwidth corresponding to each of the plurality of frequency bands.

9. The method as claimed in claim 7, further comprising: transmitting a data transmission request to the AP before receiving the trigger frame from the AP.

10. A base station, comprising:
a processor;
a memory for storing processor executable instructions; wherein,
the processor is configured to perform the method as claimed in claim 7.

11. A non-transitory computer-readable storage medium having computer instructions stored thereon, wherein when the instructions are executed by a processor, the method for transmitting data according to claim 7 is performed.

12. An access point, comprising:
a processor;
a memory for storing processor executable instructions; wherein,
the processor is configured to:
generate a trigger frame comprising a plurality of frequency band information bits and communication resource information corresponding to each of a plurality of frequency bands identified by the plurality of frequency band information bits, wherein the plurality of frequency bands identified by the plurality of frequency band information bits and the communication resource information corresponding to each of the plurality of frequency bands are configured to simultaneously transmit uplink data for one station, wherein the trigger frame further comprises an uplink bandwidth information bit and the communication resource information is related to an uplink bandwidth identified by the uplink bandwidth information bit; and
transmit the trigger frame to the one station.

13. The access point as claimed in claim 12, wherein
when each of the plurality of frequency band information bits is a first value, it indicates that a frequency band identified by a corresponding frequency band information bit is 2.4 GHz;
when each of the plurality of frequency band information bits is a second value, it indicates that the frequency band identified by the corresponding frequency band information bit is 5.8 GHz; and
when each of the plurality of frequency band information bits is a third value, it indicates that the frequency band identified by the corresponding frequency band information bit is 6-7.125 GHz.

14. The access point as claimed in claim 12, wherein
when the uplink bandwidth information bit is a first value, it indicates that the uplink bandwidth identified by the uplink bandwidth information bit is 20 MHz;
when the uplink bandwidth information bit is a second value, it indicates that the uplink bandwidth identified by the uplink bandwidth information bit is 40 MHz;
when the uplink bandwidth information bit is a third value, it indicates that the uplink bandwidth identified by the uplink bandwidth information bit is 80 MHz;
when the uplink bandwidth information bit is a fourth value, it indicates that the uplink bandwidth identified by the uplink bandwidth information bit is 160 MHz; and
when the uplink bandwidth information bit is a fifth value, it indicates that the uplink bandwidth identified by the uplink bandwidth information bit is 320 MHz.

15. The access point as claimed in claim 12, wherein the processor is further configured to:
receive a data transmission request from the one station before generating the trigger frame.

16. The access point as claimed in claim 12, wherein the trigger frame comprises a plurality of common information fields and at least one user information field;
a number of the plurality of common information fields is the same as a number of the plurality of frequency bands; each of the plurality of common information fields is corresponding to each of the at least one user information field respectively; the trigger frame combines at least one information bit of each of the plurality of common information fields and/or at least one information bit of each of the at least one user information field as one of the plurality of frequency band information bits; and each of the plurality of frequency band information bits is configured to identify a frequency band of a station corresponding to each of the at least one user information field.

* * * * *